(12) United States Patent
Kanaoka et al.

(10) Patent No.: US 7,090,738 B2
(45) Date of Patent: Aug. 15, 2006

(54) METHOD OF MANUFACTURING MEMBRANE ELECTRODE ASSEMBLY

(75) Inventors: Nagayuki Kanaoka, Saitama-ken (JP); Ryoichiro Takahashi, Saitama-ken (JP); Yoichi Asano, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/445,324

(22) Filed: May 27, 2003

(65) Prior Publication Data
US 2003/0219532 A1 Nov. 27, 2003

(30) Foreign Application Priority Data
May 27, 2002 (JP) .............................. 2002-151745

(51) Int. Cl.
*B29C 65/54* (2006.01)
*B32B 33/00* (2006.01)
*B32B 37/15* (2006.01)
*B32B 38/16* (2006.01)
*H01M 6/00* (2006.01)

(52) U.S. Cl. ...................... 156/182; 156/237; 156/243; 156/249; 156/306.9; 29/623.5; 29/890; 29/460; 29/469; 29/527.2; 264/34; 264/35; 264/46.4; 264/173.11; 264/212; 427/115; 427/333; 427/372.2; 427/418

(58) Field of Classification Search .............. 29/623.1, 29/623.3, 623.5, 825, 887, 890, 458, 460, 29/469, 527.1, 527.2, 87; 156/182, 230, 156/231, 237, 242, 243, 246, 247, 249, 278, 156/280, 285, 306.9, 307.1, 307.3, 307.5, 156/307.7, 310, 314, 319, 3, 289, 307; 429/7, 429/41, 42, 40, 44; 264/3.3, 41, 34, 35, 45.1, 264/45.8, 45.9, 46.4, 331.14, 510, 104, 129, 264/134–137, 171.21, 171, 173.11, 204, 212, 264/213, 216, 255, 239, 241; 427/115, 333, 427/118, 372.2, 402, 407.2, 418, 419.1; 428/54, 428/55, 101, 41, 42, 44
See application file for complete search history.

(56) References Cited

U.S. PATENT DOCUMENTS

| | | | |
|---|---|---|---|
| 2,878,141 A * | 3/1959 | Canniff ..................... | 427/388.2 |
| 4,655,886 A * | 4/1987 | Oda et al. ................... | 205/524 |
| 5,250,383 A * | 10/1993 | Naruse ....................... | 430/131 |
| 6,096,856 A * | 8/2000 | Helmer-Metzmann et al. .......................... | 528/374 |
| 6,277,512 B1 * | 8/2001 | Hamrock et al. ............. | 429/33 |
| 6,462,095 B1 * | 10/2002 | Bonsel et al. ................. | 516/97 |
| 6,488,721 B1 * | 12/2002 | Carlson ....................... | 29/623.5 |
| 6,780,537 B1 * | 8/2004 | Antonucci et al. ............ | 429/41 |

* cited by examiner

*Primary Examiner*—Chris Fiorilla
*Assistant Examiner*—Sing P. Chan
(74) *Attorney, Agent, or Firm*—Arent Fox, PLLC.

(57) ABSTRACT

A membrane electrode assembly having excellent electric power generating capability is produced from a base coated with first polymer electrolytic solution to form an undried first polymer electrolytic membrane. Undried first polymer electrolytic membrane is coated with first electrode dispersion of second polymer electrolytic solution and catalyst carried on a catalyst carrier and dissolved therein. First electrode dispersion is dried to form a first electrode positive-electrode membrane electrode assembly. Another base, coated with third polymer electrolytic solution, forms undried second polymer electrolytic membrane. Undried second polymer electrolytic membrane is coated with a second electrode dispersion of fourth polymer electrolytic solution and a catalyst carried on a catalyst carrier and dissolved therein. Second electrode dispersion is dried forming a second electrode negative-electrode membrane electrode assembly. The membrane electrode assemblies are integrally combined by joining said first and second polymer electrolytic membranes with fifth polymer electrolytic solution interposed therebetween.

21 Claims, 2 Drawing Sheets

METHOD OF MANUFACTURING MEMBRANE ELECTRODE ASSEMBLY

BACKGROUND OF THE INVENTION

1. Field of the Invention

The present invention relates to a method of manufacturing a membrane electrode assembly for use in a solid polymer fuel cell or the like.

2. Description of the Related Art

Known membrane electrode assemblies for use in solid polymer fuel cells or the like comprise a pair of positive and negative electrodes and a polymer electrolytic membrane sandwiched between the positive and negative electrodes.

When a reducing gas such as hydrogen, methanol, or the like is supplied to the negative electrode (fuel electrode) of a solid polymer fuel cell, the reducing gas generates protons due to the action of a catalyst contained in the negative electrode. The protons move through the polymer electrolytic membrane toward the positive electrode (oxygen electrode). When an oxidizing gas such as air, oxygen, or the like is supplied to the positive electrode (oxygen electrode) while the reducing gas is being supplied to the negative electrode (fuel electrode), the protons react with the oxidizing gas, generating water, due to the action of a catalyst contained in the positive electrode. As a result, an electric current can be extracted from a conductive wire connected between the positive and negative electrodes.

The solid polymer fuel cell has its electric power generating capability governed by the ease with which the protons generated on the negative electrode move toward the positive electrode. For quickly moving the protons toward the positive electrode, it is necessary for the positive electrode and the polymer electrolytic membrane, which serves as a partition membrane, to be well kept in contact with each other, and also for the polymer electrolytic membrane to have a low resistance in the membrane electrode assembly. Therefore, the polymer electrolytic membrane should desirably be as thin as possible.

The membrane electrode assembly is manufactured by forming a pair of membrane-like electrodes and a polymer electrolytic membrane, placing the polymer electrolytic membrane between the electrodes, and pressing them together with a hot press. However, since the polymer electrolytic membrane is hot-pressed while it is being softened with heat, if the polymer electrolytic membrane is thin, then it may possibly be damaged to cause a gas leakage or a short circuit between the electrodes. This problem aggravates itself if the electrodes have a low level of smoothness.

The hot press is problematic in that when pressed, the electrodes become less permeable to air because they are compressed into a denser structure. Another problem of the hot press is that good contact cannot be achieved between the electrodes and the polymer electrolytic membrane.

To solve the above problems, there has been proposed a process of integrally forming a polymer electrolytic membrane and electrodes. According to the proposed process, a board such as a plastic film or the like is coated with an electrode dispersion containing a catalyst carried by a catalyst carrier and dispersed in a polymer electrolytic solution, and then dried into a membrane electrode. The membrane electrode is then coated with a polymer electrolytic solution, and then dried.

According to the proposed process, after two assemblies each comprising an electrode and a polymer electrolytic membrane which are integrally combined with each other are prepared, and the polymer electrolytic membranes of the respective assemblies are joined to each other, thus producing a membrane electrode assembly which comprises a polymer electrolytic membrane sandwiched between a pair of electrodes.

The polymer electrolytic membranes may be joined to each other by a process of superposing and hot-pressing the polymer electrolytic membranes, a process of superposing the polymer electrolytic membranes with a polymer electrolytic solution interposed therebetween and then drying the assembly, or a process of superposing the polymer electrolytic membranes as they are undried and then drying the polymer electrolytic membranes.

The above proposed process allows a polymer electrolytic membrane to be reduced in thickness, and can produce a membrane electrode assembly without causing damage to the polymer electrolytic membrane.

However, the proposed process is disadvantageous in that inasmuch as a membrane-like electrode is coated with a polymer electrolytic solution to produce a polymer electrolytic membrane, the applied polymer electrolytic solution tends to permeate the electrode, reducing the air-permeability of the electrode.

SUMMARY OF THE INVENTION

It is an object of the present invention to provide a method of manufacturing a membrane electrode assembly which is free of the drawbacks of the conventional membrane electrode assemblies and has an excellent electric power generating capability.

To achieve the above object, there is provided a method of manufacturing a membrane electrode assembly which has a pair of positive and negative electrodes and a polymer electrolytic membrane sandwiched between the positive and negative electrodes, the method comprising the steps of coating a base with a first polymer electrolytic solution to form a first polymer electrolytic membrane which is undried at least on its surface, coating the first polymer electrolytic membrane which is undried with a first electrode dispersion, which comprises a second polymer electrolytic solution and a catalyst carried on a catalyst carrier and dissolved therein, drying the first electrode dispersion to form a first electrode, thereby forming a positive-electrode membrane electrode assembly which comprises the first polymer electrolytic membrane and the first electrode that are integrally joined to each other, coating a base with a third polymer electrolytic solution to form a second polymer electrolytic membrane which is undried at least on its surface, coating the second polymer electrolytic membrane which is undried with a second electrode dispersion, which comprises a fourth polymer electrolytic solution and a catalyst carried on a catalyst carrier and dissolved therein, drying the second electrode dispersion to form a second electrode, thereby forming a negative-electrode membrane electrode assembly which comprises the second polymer electrolytic membrane and the second electrode that are integrally joined to each other, peeling the positive-electrode membrane electrode assembly and the negative-electrode membrane electrode assembly off the respective bases, joining the first polymer electrolytic membrane and the second polymer electrolytic membrane to each other with a fifth polymer electrolytic solution interposed therebetween for thereby integrally combining the positive-electrode membrane electrode assembly and the negative-electrode membrane electrode assembly with each other.

According to the above method, the base is coated with the first polymer electrolytic solution to form the first polymer electrolytic membrane which is undried at least on its surface. At this time, while the surface of the first polymer electrolytic membrane is undried, the first polymer electrolytic membrane is coated with the first electrode dispersion, which comprises the second polymer electrolytic solution and the catalyst carried on the catalyst carrier and dissolved therein. Then, the first electrode dispersion is dried to form the first electrode. As a result, the positive-electrode membrane electrode assembly which comprises the first polymer electrolytic membrane and the first electrode that are integrally joined to each other is produced.

Then, the other base is coated with the third polymer electrolytic solution to form the second polymer electrolytic membrane which is undried at least on its surface. At this time, while the surface of the second polymer electrolytic membrane is undried, the second polymer electrolytic membrane is coated with the second electrode dispersion, which comprises the second polymer electrolytic solution and the catalyst carried on the catalyst carrier and dissolved therein. Then, the second electrode dispersion is dried to form the second electrode. As a result, the negative-electrode membrane electrode assembly which comprises the second polymer electrolytic membrane and the second electrode that are integrally joined to each other is produced.

Thereafter, the positive-electrode membrane electrode assembly and the negative-electrode membrane electrode assembly are peeled off the respective bases, and the first polymer electrolytic membrane and the second polymer electrolytic membrane are joined to each other with the fifth polymer electrolytic solution interposed therebetween for thereby forming a membrane electrode assembly in which the positive-electrode membrane electrode assembly and the negative-electrode membrane electrode assembly are integrally combined with each other and the polymer electrolytic membrane is interposed between the first and second electrodes.

According to the above method, the bases are coated with the polymer electrolytic solutions to form the polymer electrolytic membranes. Therefore, the polymer electrolytic membranes may have an increased thickness.

According to the above method, furthermore, after the positive-electrode membrane electrode assembly and the negative-electrode membrane electrode assembly are peeled off the respective bases, the polymer electrolytic membranes are joined to each other with the fifth polymer electrolytic solution interposed therebetween. Consequently, the polymer electrolytic membranes are prevented from being damaged.

For producing each of the positive-electrode membrane electrode assembly and the negative-electrode membrane electrode assembly, the polymer electrolytic membrane is first formed, and then coated with the electrode dispersion to form the electrode. Therefore, the first and third polymer electrolytic solutions are prevented from permeating the electrodes, which are thus made highly permeable to air.

As a consequence, the above method makes it possible to manufacture a membrane electrode assembly having an excellent electric power generating capability.

The first through fifth polymer electrolytic solutions may be identical to each other or different from each other.

The fifth polymer electrolytic solution may contain a water retaining agent. If the fifth polymer electrolytic solution contains a water retaining agent, then the membrane electrode assembly which is constructed of the positive-electrode membrane electrode assembly and the negative-electrode membrane electrode assembly that are integrally combined with each other includes a polymer electrolytic membrane having an excellent water retaining ability between the first and second polymer electrolytic membranes. As a result, a solid polymer fuel cell which incorporates the above membrane electrode assembly can be operated in a low-humidity state.

In the membrane electrode assembly, if the polymer electrolytic membrane sandwiched between the electrodes has an excellent water retaining ability, then its durability is relatively low. This is because when the solid polymer fuel cell is in operation, radicals generated in the vicinity of membrane-to-electrode interfaces tend to enter the polymer skeleton, accelerating the deterioration of the polymer electrolytic membrane.

In the membrane electrode assembly manufactured by the method according to the present invention, however, the highly water-retentive polymer electrolytic membrane is interposed between the first and second polymer electrolytic membranes. Therefore, the highly water-retentive polymer electrolytic membrane is kept out of contact with the electrodes, and remains highly durable.

According to the above method, the first polymer electrolytic solution has an ion exchange capacity ranging from 0.8 to 2.8 meq/g, preferably from 1.2 to 2.8 meq/q, and the third polymer electrolytic solution has an ion exchange capacity ranging from 0.9 to 3.0 meq/g, preferably from 1.3 to 3.0 meq/g, and greater than the ion exchange capacity of the polymer electrolyte contained in the first polymer electrolytic solution. In this manner, the second polymer electrolytic membrane formed from the second polymer electrolytic solution has a higher water content than the first polymer electrolytic membrane formed from the first polymer electrolytic solution. Therefore, a water content gradient is developed across the polymer electrolytic membrane sandwiched between the first and second electrodes.

As a result, while the solid polymer fuel cell incorporating the membrane electrode assembly is in operation, water generated in the positive electrode is positively returned to the negative electrode. The solid polymer fuel cell can thus be operated in a low-humidity state.

If the ion exchange capacity of the polymer electrolyte contained in the first polymer electrolytic solution were smaller than 0.8 meq/g, then the solid polymer fuel cell incorporating the membrane electrode assembly manufactured by the method according to the present invention might not have a sufficient electric power generating capability while in operation. If the ion exchange capacity of the polymer electrolyte contained in the first polymer electrolytic solution exceeded 2.8 meq/g, then an appropriate water content gradient might not be developed between the first polymer electrolytic membrane formed from the first polymer electrolytic solution and the second polymer electrolytic membrane formed from the second polymer electrolytic solution.

If the ion exchange capacity of the polymer electrolyte contained in the second polymer electrolytic solution were smaller than 0.9 meq/g, then an appropriate water content gradient might not be developed between the first polymer electrolytic membrane formed from the first polymer electrolytic solution and the second polymer electrolytic membrane formed from the second polymer electrolytic solution. If the ion exchange capacity of the polymer electrolyte contained in the second polymer electrolytic solution exceeded 3.0 meq/g, then the second polymer electrolytic membrane formed from the second polymer electrolytic solution would have a fragile molecular structure.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 1:
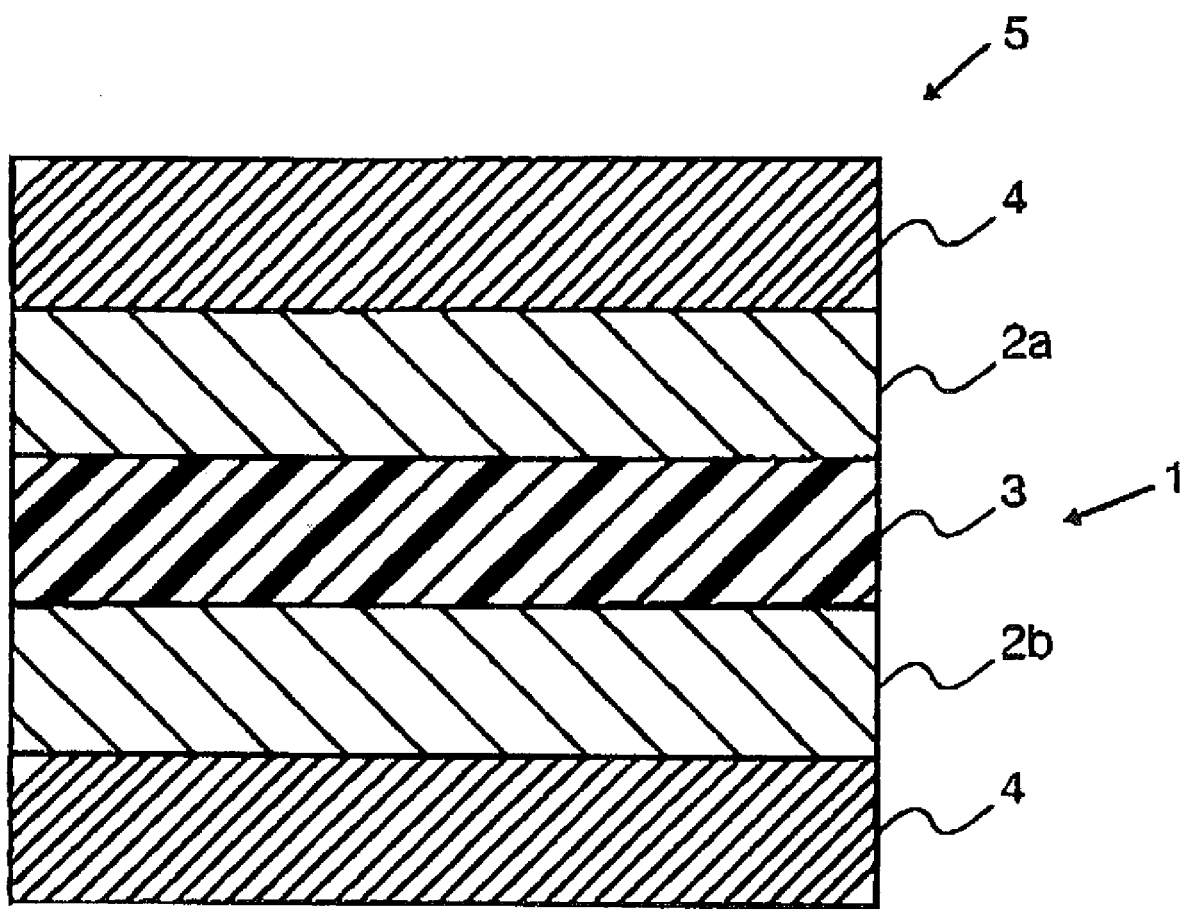
FIG. 1 is a cross-sectional view of a solid polymer fuel cell which incorporates a membrane electrode assembly manufactured by a manufacturing method according to the present invention.

As shown in FIG. 1, a membrane electrode assembly 1 manufactured by a manufacturing method according to the present invention comprises a pair of electrodes, i.e., a positive electrode 2a and a negative electrode 2b, and a polymer electrolytic membrane layer 3 sandwiched between the positive electrode 2a and the negative electrode 2b. The membrane electrode assembly 1 supports a pair of diffusion layers 4 respectively on the positive electrode 2a and the negative electrode 2b, thereby making up a solid polymer fuel cell 5. The diffusion layer 4 on the positive electrode 2a supplies an oxidizing gas such as air, oxygen, or the like therethrough to the positive electrode 2a. The diffusion layer 4 on the negative electrode 2b supplies a reducing gas such as hydrogen, methanol, or the like therethrough to the negative electrode 2b.

Figure 2A:
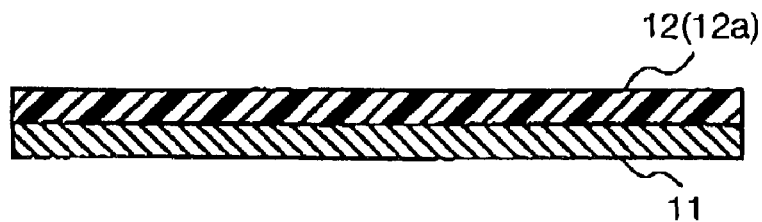
FIGS. 2(a) through 2(d) are cross-sectional views illustrative of successive steps of the manufacturing method according to the present invention.

According to the manufacturing method of the present invention, the membrane electrode assembly 1 is manufactured as follows:

As shown in FIG. 2(a), a base 11 in the form of a plastic film is coated with a polymer electrolytic solution 12, producing a polymer electrolytic membrane 12a which is undried at least on its surface. The plastic film used as the base 11 may comprise a film of polyethylene terephthalate, polytetrafluoroethylene and polyimide.

The polymer electrolytic membrane 12 comprises a solvent and a polymer electrolyte dissolved in the solvent. The polymer electrolyte may be perfluorosulfonic acid, sulfonated polyarylene, sulfonated polyether-ether ketone, sulfonated polybenzimidazole, etc. The solvent for dissolving the polymer electrolyte may be N-methyl pyrrolidone, a mixture of methanol and N-methyl pyrrolidone, a mixture of ethanol and N-methyl pyrrolidone, a mixture of isopropanol and normal propanol, a mixture of water, tetrahydrofurane, and N-methyl pyrrolidone, a mixture of water, methyl ethyl ketone, and N-methyl pyrrolidone, a mixture of water, dimethyl formamide, and N-methyl pyrrolidone, a mixture of isopropanol, normal propanol, and water, water, a mixture of water, ethanol, and isopropanol, or the like.

The polymer electrolyte and the solvent may be used in any of various combinations of the above materials. For example, if the polymer electrolyte is sulfonated polyarylene, then a mixture of methanol and N-methyl pyrrolidone, a mixture of ethanol and N-methyl pyrrolidone, a mixture of water, tetrahydrofurane, and N-methyl pyrrolidone, a mixture of water, methyl ethyl ketone, and N-methyl pyrrolidone, a mixture of water, dimethyl formamide, and N-methyl pyrrolidone, or the like is suitable for use as the solvent.

The base 11 may be coated with the polymer electrolytic solution 12 by a blade coating process, a spray coating process, a die slot coating process, a curtain coater process, or the like. However, the spray coating process is the most preferable.

Figure 2B:
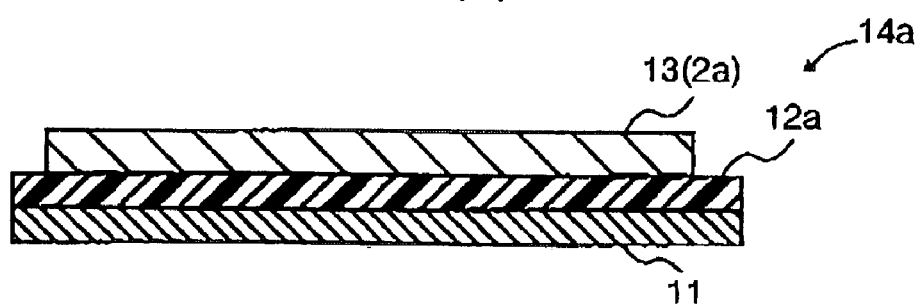

When the base 11 is coated with the polymer electrolytic solution 12, the polymer electrolytic solution 12 is dried progressively from its portion close to the base 11, producing the polymer electrolytic membrane 12a which is undried at least on its surface. According to the present embodiment, as shown in FIG. 2(b), while at least the surface of the polymer electrolytic membrane 12a remains undried, the polymer electrolytic membrane 12a is coated with an electrode dispersion 13 containing a catalyst carried by a catalyst carrier and dispersed in a polymer electrolytic solution, and then dried into an electrode 2a.

The catalyst may comprise a powder of platinum, ruthenium, rhodium, or the like. The catalyst carrier may comprise a powder of carbon such as acetylene black, Ketjen black, VULCAN, etc.

The polymer electrolytic solution in the electrode dispersion 13 may comprise a solvent and a polymer electrolyte of perfluorosulfonic acid dissolved in the solvent, and may also include various additives which are known per se. The solvent for dissolving the polymer electrolyte of perfluorosulfonic acid may be a mixture of isopropanol, normal propanol, and water, a mixture of water, ethanol, and isopropanol, ethylene glycol, or the like.

The undried polymer electrolytic membrane 12a may be coated with the electrode dispersion 13 by a blade coating process, a spray coating process, an ink jet process, or the like. However, the spray coating process is the most preferable.

Then, the undried polymer electrolytic membrane 12a is completely dried, and the electrode dispersion 13 is completely dried, producing a positive-electrode membrane electrode assembly 14a which is constructed of the polymer electrolytic membrane 12a and the electrode 2a that are integrally joined to each other.

At this time, the polymer electrolytic solution 12 contains a polymer electrolyte having an ion exchange capacity ranging from 0.8 to 2.8 meq/g, preferably from 1.2 to 2.8 meq/g. As a result, the polymer electrolytic membrane 12a of the positive-electrode membrane electrode assembly 14a has an ion exchange capacity in the above range.

Figure 2C:
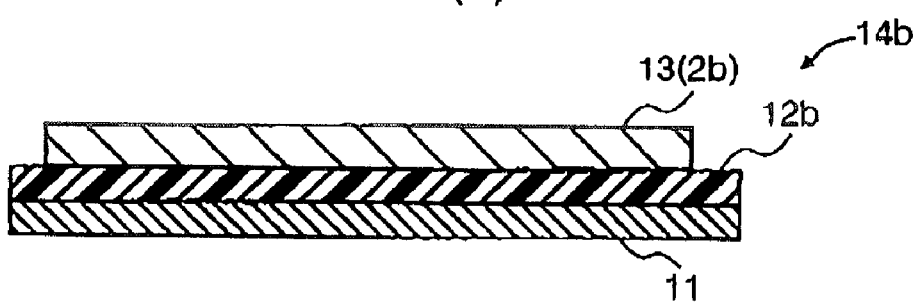
Figure 2D:
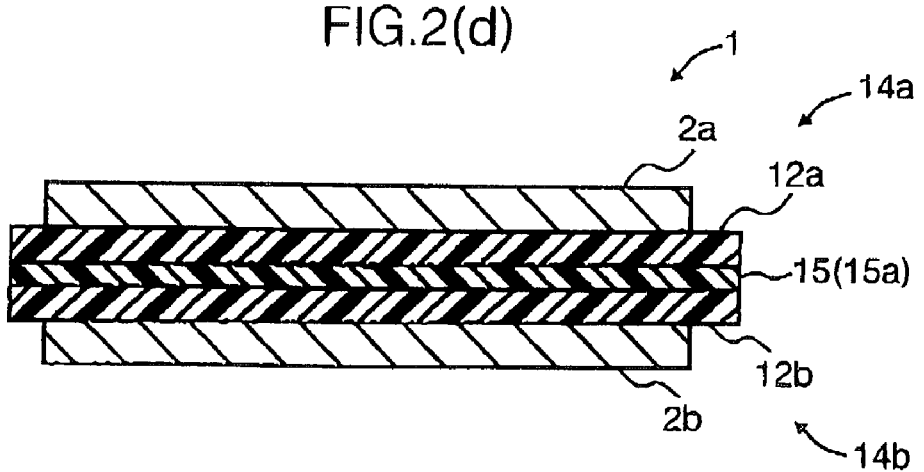

Then, a negative-electrode membrane electrode assembly 14b which is constructed of a polymer electrolytic membrane 12b and an electrode 2b that are integrally joined to each other, as shown in FIG. 2(c), is produced in the same manner as with the positive-electrode membrane electrode assembly 14a, except that the polymer electrolytic solution 12 contains a polymer electrolyte having an ion exchange capacity ranging from 0.9 to 3.0 meq/g, preferably from 1.3 to 3.0 meq/g, and greater than the ion exchange capacity of the polymer electrolytic membrane 12a of the positive-electrode membrane electrode assembly 14a. As a result, the polymer electrolytic membrane 12b of the negative-electrode membrane electrode assembly 14b has an ion exchange capacity falling in the above range and greater than the ion exchange capacity of the polymer electrolytic membrane 12a of the positive-electrode membrane electrode assembly 14a.

Then, as shown in FIG. 12(d), the positive-electrode membrane electrode assembly 14a and the negative-electrode membrane electrode assembly 14b are peeled off the respective bases 11, and then joined to each other by superposing the polymer electrolytic membranes 12a, 12b on each other in facing relation with a polymer electrolytic solution 15, which contains a water retaining agent therein, interposed therebetween. In this manner, a membrane electrode assembly 1 is produced which includes the positive-electrode membrane electrode assembly 14a and the negative-electrode membrane electrode assembly 14b that are joined to each other by a water-retentive polymer electrolytic membrane 15a which is formed from the polymer electrolytic solution 15.

The membrane electrode assembly 1 thus produced has a polymer electrolytic membrane layer 3, which comprises the polymer electrolytic membrane 12a, the water-retentive polymer electrolytic membrane 15a, and the polymer electrolytic membrane 12b, disposed between the positive electrode 2a and the negative electrode 2b. The polymer electrolytic membrane 12a has an ion exchange capacity ranging from 0.8 to 2.8 meq/g, preferably from 1.2 to 2.8 meq/g, and the polymer electrolytic membrane 12b has an ion exchange capacity ranging from ranging from 0.9 to 3.0 meq/g, preferably from 1.3 to 3.0 meq/g, and greater than the ion exchange capacity of the polymer electrolytic membrane 12a of the positive-electrode membrane electrode assembly 14a. As a result, the polymer electrolytic membrane 12b of the negative-electrode membrane electrode assembly 14b has a higher water content.

The polymer electrolytic solution 15 comprises a solvent, a polymer electrolyte dissolved in the solvent, and the water retaining agent referred to above. The solvent and the polymer electrolyte may be the same as those of the polymer electrolytic solution 12.

The water retaining agent may be a metal oxide such as laminar silicate, silicic anhydride (silica), titania, or the like, a heteropolyacid such as 12-tungusto-phosphoric acid or the like, or a polymer having a hydrophilic functional group such as —OH, —COOH, —SO$_3$H, or the like. The water retaining agent is added in a range from 0.1 to 10 weight %, for example, with respect to the polymer electrolyte in the polymer electrolytic solution 15.

The polymer electrolytic solution 15 may be applied to both the polymer electrolytic membranes 12a, 12b or either one of the polymer electrolytic membranes 12a, 12b.

The positive-electrode membrane electrode assembly 14a and the negative-electrode membrane electrode assembly 14b may be joined to each other by superposing them with the polymer electrolytic solution 15 interposed therebetween and then hot-pressing them together. The positive-electrode membrane electrode assembly 14a and the negative-electrode membrane electrode assembly 14b may be joined to each other by drying the polymer electrolytic solution 15 interposed therebetween.

The polymer electrolytic solution 15 may be dried by far-infrared rays or hot air or both far-infrared rays and hot air.

In the present embodiment, the ion exchange capacity of the polymer electrolyte contained in the polymer electrolytic solution 12 is greater in the negative electrode than in the positive electrode. However, the ion exchange capacity of the polymer electrolyte contained in the polymer electrolytic solution 12 may be the same in the negative electrode and the positive electrode.

If the ion exchange capacity of the polymer electrolyte contained in the polymer electrolytic solution 12 is greater in the positive electrode than in the negative electrode, then the water content in the polymer electrolytic membrane 12a in the positive electrode is greater in the membrane electrode assembly 16. With such membrane electrode assembly 16, since water generated in the positive electrode cannot be returned to the negative electrode when the solid polymer fuel cell is in operation, it is difficult to operate the solid polymer fuel cell in a low-humidity state.

In the present embodiment, the water retaining agent is added to the polymer electrolytic solution 15. However, the water retaining agent may not necessarily be added to the polymer electrolytic solution 15.

Although a certain preferred embodiment of the present invention has been shown and described in detail, it should be understood that various changes and modifications may be made therein without departing from the scope of the appended claims.

What is claimed is:

1. A method of manufacturing a membrane electrode for a solid polymer fuel cell assembly which has a pair of positive and negative electrodes and a polymer electrolytic membrane sandwiched between the positive and negative electrodes, said method comprising the steps of:

coating a base with a first polymer electrolytic solution to form a first polymer electrolytic membrane which is dried progressively from a portion therein close to the base and remains undried at least on the surface thereof;

coating said first polymer electrolytic membrane, prior to drying the surface of said first polymer electrolytic membrane, with a first electrode dispersion, which comprises a second polymer electrolytic solution and a catalyst carried on a catalyst carrier and dissolved therein;

drying said first electrode dispersion and said first polymer electrolytic membrane to form a first electrode, thereby forming a positive-electrode membrane electrode assembly which comprises the first polymer electrolytic membrane and the first electrode that are integrally joined to each other;

coating a base with a third polymer electrolytic solution to form a second polymer electrolytic membrane which is dried progressively from a portion therein close to the base and remains undried at least on the surface thereof;

coating said second polymer electrolytic membrane which is undried at least on the surface thereof with a second electrode dispersion, which comprises a fourth polymer electrolytic solution and a catalyst carried on a catalyst carrier and dissolved therein;

drying said second electrode dispersion and said second polymer electrolytic membrane to form a second electrode, thereby forming a negative-electrode membrane electrode assembly which comprises the second polymer electrolytic membrane and the second electrode that are integrally joined to each other;

peeling said positive-electrode membrane electrode assembly and said negative-electrode membrane electrode assembly off the respective bases;

joining said first polymer electrolytic membrane and said second polymer electrolytic membrane to each other with a fifth polymer electrolytic solution interposed therebetween for thereby integrally combining said positive-electrode membrane electrode assembly and said negative-electrode membrane electrode assembly with each other.

2. A method according to claim 1, wherein each of said bases comprises a plastic film made of a material selected from the group consisting of polyethylene terephthalate, polytetrafluoroethylene and polyimide.

3. A method according to claim 1, wherein each of said first polymer electrolytic solution, said third polymer electrolytic solution, and said fifth polymer electrolytic solution comprises a solvent and a polymer electrolyte dissolved therein, said polymer electrolyte comprising a material selected from the group consisting of perfluorosulfonic acid, sulfonated polyarylene, sulfonated polyether-ether ketone, and sulfonated polybenzimidazole.

4. A method according to claim 3, wherein said solvent comprises at least one material selected from the group consisting of N-methyl pyrrolidone, a mixture of methanol and N-methyl pyrrolidone, a mixture of ethanol and N-methyl pyrrolidone, a mixture of isopropanol and normal propanol, a mixture of water, tetrahydrofurane, and N-methyl pyrrolidone, a mixture of water, methyl ethyl ketone, and N-methyl pyrrolidone, a mixture of water, dimethyl formamide, and N-methyl pyrrolidone, a mixture of isopropanol, normal propanol, and water, and a mixture of water, ethanol, and isopropanol.

5. A method according to claim 3, wherein said polymer electrolyte comprises sulfonated polyarylene.

6. A method according to claim 5, wherein said solvent comprises at least one material selected from the group consisting of a mixture of methanol and N-methyl pyrrolidone, a mixture of ethanol and N-methyl pyrrolidone, a mixture of water, tetrahydrofurane, and N-methyl pyrrolidone, a mixture of water, methyl ethyl ketone, and N-methyl pyrrolidone, and a mixture of water, dimethyl formamide, and N-methyl pyrrolidone.

7. A method according to claim 1, wherein said first polymer electrolytic solution includes a polymer electrolyte having an ion exchange capacity ranging from 0.8 to 2.8 meq/g, and said third polymer electrolytic solution includes a polymer electrolyte having an ion exchange capacity ranging from 0.9 to 3.0 meq/g and greater than the ion exchange capacity of the polymer electrolyte contained in said first polymer electrolytic solution.

8. A method according to claim 7, wherein said first polymer electrolytic solution includes a polymer electrolyte having an ion exchange capacity ranging from 1.2 to 2.8 meq/g, and said third polymer electrolytic solution includes a polymer electrolyte having an ion exchange capacity ranging from 1.3 to 3.0 meq/g and greater than the ion exchange capacity of the polymer electrolyte contained in said first polymer electrolytic solution.

9. A method according to claim 1, wherein said fifth polymer electrolytic solution contains a water retaining agent.

10. A method according to claim 9, wherein said water retaining agent comprises at least one compound selected from the group consisting of laminar silicate, silicic anhydride (silica), titania, 12-tungusto-phosphoric acid, and a polymer having a hydrophilic functional group.

11. A method according to claim 1, wherein said bases are coated with said first polymer electrolytic solution and said third polymer electrolytic solution, respectively, by a process selected from the group consisting of a blade coating process, a spray coating process, a die slot coating process, and a curtain coater process.

12. A method according to claim 11, wherein said bases are coated with said first polymer electrolytic solution and said third polymer electrolytic solution, respectively, by a spray coating process.

13. A method according to claim 1, wherein said catalyst comprises at least one metal powder selected from the group consisting of a powder of platinum, a powder of ruthenium, and a powder of rhodium.

14. A method according to claim 1, wherein said catalyst carrier comprises a powder of carbon.

15. A method according to claim 1, wherein each of said second polymer electrolytic solution and said fourth polymer electrolytic solution comprises a solvent and a polymer electrolyte of perfluorosulfonic acid dissolved in said solvent.

16. A method according to claim 15, wherein said solvent comprises at least one material selected from the group consisting of a mixture of isopropanol, normal propanol, and water, a mixture of water, ethanol, and isopropanol, and ethylene glycol.

17. A method according to claim 1, wherein the polymer electrolytic membranes which are undried at least on the surface thereof are coated with the first electrode dispersion and said second electrode dispersion, respectively, by a process selected from the group consisting of a blade coating process, a spray coating process, and an ink jet process.

18. A method according to claim 17, wherein the polymer electrolytic membranes which are undried on at least the surface thereof are coated with the first electrode dispersion and said second electrode dispersion, respectively, by a spray coating process.

19. A method according to claim 1, wherein said positive-electrode membrane electrode assembly and said negative-electrode membrane electrode assembly are integrally combined with each other by hot-pressing said first polymer electrolytic membrane and said second polymer electrolytic membrane to each other with said fifth polymer electrolytic solution interposed therebetween.

20. A method according to claim 1, wherein said positive-electrode membrane electrode assembly and said negative-electrode membrane electrode assembly are integrally combined with each other by drying said fifth polymer electrolytic solution interposed between said first polymer electrolytic membrane and said second polymer electrolytic membrane.

21. A method according to claim 20, wherein said fifth polymer electrolytic solution is dried by at least one of far-infrared rays and hot air.

* * * * *